United States Patent
Dimitrov et al.

(10) Patent No.: US 11,481,950 B2
(45) Date of Patent: *Oct. 25, 2022

(54) REAL-TIME HARDWARE-ASSISTED GPU TUNING USING MACHINE LEARNING

(71) Applicant: NVIDIA Corporation, Santa Clara, CA (US)

(72) Inventors: Rouslan L. Dimitrov, Santa Clara, CA (US); Dale L. Kirkland, Madison, AL (US); Emmett M. Kilgariff, San Jose, CA (US); Sachin Satish Idgunji, San Jose, CA (US); Siddharth Sharma, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,550

(22) Filed: Jan. 29, 2021

(65) Prior Publication Data
US 2021/0174569 A1     Jun. 10, 2021

Related U.S. Application Data

(63) Continuation of application No. 15/863,780, filed on Jan. 5, 2018, now Pat. No. 10,909,738.

(51) Int. Cl.
*G06T 15/00* (2011.01)
*G06N 3/08* (2006.01)
*G06T 17/10* (2006.01)
*G06T 15/80* (2011.01)

(52) U.S. Cl.
CPC ............ *G06T 15/005* (2013.01); *G06N 3/08* (2013.01); *G06T 15/80* (2013.01); *G06T 17/10* (2013.01)

(58) Field of Classification Search
CPC .......... G06N 3/08; G06T 15/005; G06T 17/10
See application file for complete search history.

(56) References Cited

U.S. PATENT DOCUMENTS

| | | | |
|---|---|---|---|
| 6,658,305 B1 | 12/2003 | Gudmundsson et al. |
| 7,093,147 B2 | 8/2006 | Farkas et al. |
| 7,599,749 B2 | 10/2009 | Sayyarrodsari et al. |

(Continued)

FOREIGN PATENT DOCUMENTS

CN          106155634 A          11/2016

OTHER PUBLICATIONS

NPL: Michael A. Nielsen, Neural Networks and Deep Learning, Jan. 3, 2018 (Year: 2018).*

(Continued)

*Primary Examiner* — Ming Wu
(74) *Attorney, Agent, or Firm* — Leydig, Voit & Mayer, Ltd.

(57) ABSTRACT

Graphics processing unit (GPU) performance and power efficiency is improved using machine learning to tune operating parameters based on performance monitor values and application information. Performance monitor values are processed using machine learning techniques to generate model parameters, which are used by a control unit within the GPU to provide real-time updates to the operating parameters. In one embodiment, a neural network processes the performance monitor values to generate operating parameters in real-time.

20 Claims, 10 Drawing Sheets

(56) References Cited

U.S. PATENT DOCUMENTS

| | | | |
|---|---|---|---|
| 7,778,800 B2 | 8/2010 | Aguaviva et al. | |
| 7,999,830 B1* | 8/2011 | Van Hoff | G06T 11/60 |
| | | | 345/418 |
| 8,806,491 B2 | 8/2014 | Cai et al. | |
| 8,860,502 B2* | 10/2014 | Gemmeke | G06F 1/324 |
| | | | 716/108 |
| 8,965,819 B2 | 2/2015 | Tirunagari | |
| 9,432,298 B1* | 8/2016 | Smith | H04L 47/34 |
| 9,590,636 B1* | 3/2017 | McKinley | H01L 21/76892 |
| 9,619,009 B2 | 4/2017 | Rotem et al. | |
| 9,721,214 B1 | 8/2017 | Corrado et al. | |
| 2005/0019934 A1 | 1/2005 | Duerr | |
| 2005/0199341 A1 | 9/2005 | Delp et al. | |
| 2008/0183449 A1 | 7/2008 | Grichnik et al. | |
| 2009/0164399 A1* | 6/2009 | Bell, Jr. | G06F 9/5083 |
| | | | 712/30 |
| 2009/0165007 A1 | 6/2009 | Aghajanyan | |
| 2012/0079500 A1* | 3/2012 | Floyd | G06Q 30/06 |
| | | | 718/105 |
| 2014/0281609 A1 | 9/2014 | Hanumaiah et al. | |
| 2014/0365195 A1 | 12/2014 | Lahiri et al. | |
| 2016/0189059 A1 | 6/2016 | Ishii | |
| 2016/0321777 A1 | 11/2016 | Jin et al. | |
| 2017/0140273 A1 | 5/2017 | Sagher et al. | |
| 2017/0228256 A1 | 8/2017 | Granshaw et al. | |
| 2017/0364733 A1 | 12/2017 | Estrada et al. | |
| 2018/0029597 A1* | 2/2018 | Gage | B60W 30/182 |
| 2018/0108166 A1* | 4/2018 | Oreifej | G06T 15/005 |

OTHER PUBLICATIONS

Multicore and GPU Parallelization of Neural Networks for Face Recognition, Altaf Ahmad Huqqania, Erich Schikutaa, Sicen Yea, Peng Chena; Year: 2013 (Year: 2013).*

Biachini et al., "Evaluating the Performance of Multithreading and Prefetching in Multiprocessors," Journal of Parallel and Distributed Computing, vol. 37, No. 1, 1996, pp. 1-56.

Fito, et al., "Analyzing the Performance of a Multithread Application Server and its Limitations in a Multiprocessor Environment," Computer Architecture Department—Technical University of Catalonia, pp. 1-12.

Feehrer et al., "Coherency Hub Design for Multi-Node Victoria Falls Server Systems," High Performance Interconnects, 16th IEEE Symposium on High Performance Interconnects, 2008, pp. 43-50.

Andersch, M., "Inference: The Next Step in GPU-Accelerated Deep Learning," Nvidia, Nov. 11, 2015, pp. 1-7, as retrieved from https://devblogs.nvidia.com/parallelforall/inference-next-step-gpu-accelerated-deep-learning/.

Huqqania, A., et al., "Multicore and GPU Parallelization of Neural Networks for Face Recognition," 2013.

Nielsen, M., "Neural Networks and Deep Learning," Jan. 3, 2018.

* cited by examiner

REAL-TIME HARDWARE-ASSISTED GPU TUNING USING MACHINE LEARNING

CLAIM OF PRIORITY

This application is a continuation of U.S. application Ser. No. 15/863,780 titled "Real-Time Hardware-Assisted GPU Tuning Using Machine Learning," filed Jan. 5, 2018, the entire contents of which is incorporated herein by reference.

FIELD OF THE INVENTION

The present invention relates to operational tuning in a processing unit, and more particularly to real-time hardware-assisted graphics processing unit (GPU) tuning using machine learning.

BACKGROUND

Modern graphics processing units (GPUs) are commonly tasked to execute a wide range of applications, each with potentially very different workloads and resource utilization. A number of different operating parameters can impact performance and/or power consumption of a given GPU. One exemplary operating parameter is the number of pixels being processed concurrently at any one time. If too many pixels are being simultaneously processed, cache misses may drive down overall performance because of cache overutilization. However, if too few pixels are simultaneously processed, underutilization of processing capacity will instead drive down overall performance. For any given workload, an optimal number of pixels should be scheduled for peak GPU performance. Another exemplary operating parameter is clock speed (e.g., core clock speed, memory clock speed, etc.). During normal operation of a GPU, if a given workload only requires a lower clock speed, then processing the workload at a higher clock speed than required will result in lower power efficiency.

Conventional techniques for determining operating parameters for a GPU typically involve configuring the GPU, such as by manually generated heuristics, to operate using various available combinations of parameter values and measuring resulting GPU performance and/or efficiency until a set of operating parameter values is found to satisfy operational requirements. The GPU is then configured to use the set of operating parameters for application workloads. However, such techniques fail to adapt to dynamic workloads associated with common applications. Thus, there is a need for addressing these issues and/or other issues associated with the prior art.

SUMMARY

A method, computer readable medium, and system are configured to generate processor operating parameters based on performance monitor values. In one embodiment, the system includes circuit comprising a multiprocessing unit, performance monitor circuits within the multiprocessing unit, and a control unit. The multiprocessing unit is configured to execute a multithreaded application according to one or more operating parameters. The performance monitoring circuits are configured to measure and report performance monitor values during execution of the multithreaded application. The control unit is configured to generate the one or more operating parameters based on the performance monitor values. In one embodiment, the control unit includes a machine learning model configured to receive the performance monitor values as inputs and update the one or more operating parameters as outputs during execution of the multithreaded application.

The computer readable medium includes instructions that, when executed by a processing unit, perform the method. Furthermore, the system includes circuitry configured to perform the method.

DETAILED DESCRIPTION

Figure 1A:
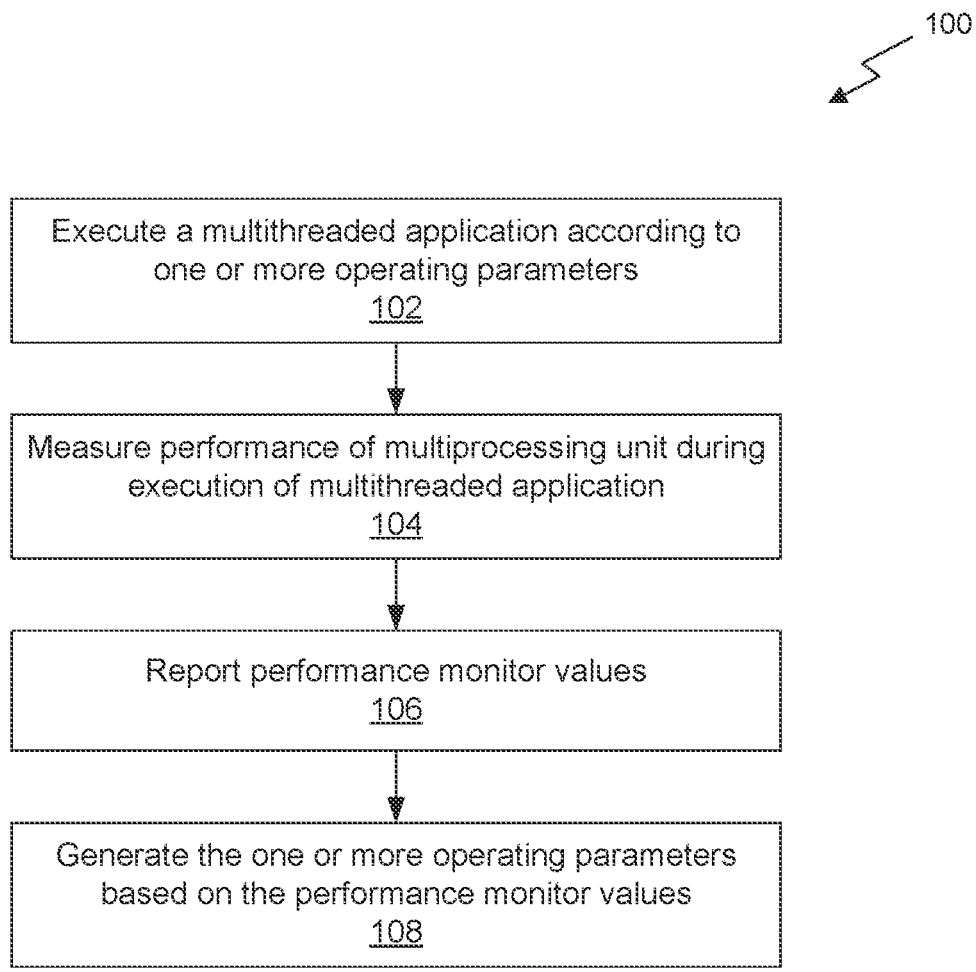
FIG. 1A illustrates a flowchart of a method for generating operating parameters for a multiprocessing unit, in accordance with one embodiment.

Embodiments of the present invention improve real-time operation of a multiprocessing unit by applying machine learning to determine certain operating parameters. In one embodiment, the multiprocessing unit comprises a graphics processing unit (GPU).

The multiprocessing unit includes performance monitoring counters (PMs), comprising logic circuits configured to measure different performance-related values in real-time. In one embodiment, PMs may be configured to monitor at least one of a memory request counter, a memory system bandwidth utilization, a memory system storage capacity utilization, a cache hit rate, a count of instructions executed per clock cycle for one or more threads of a multithreaded program, and a count of instructions executed for one or more threads of the multithreaded program. Furthermore, a PM may be configured to monitor a value for pixels drawn for a processing core, a count of pixels and/or primitives that are shaded, screen tiles that are touched, current clock rates, and counts of memory and/or arithmetic operations. The PMs may report resulting monitor values in real time, or the PMs may report monitor values through structured access circuitry. Furthermore, the multiprocessing unit may be configured to operate according to one or more different operating parameters that determine how the multiprocessing unit performs operations, but otherwise do not alter final results of the operations. For example, an operating parameter may specify a maximum number of related concurrently executing threads (e.g., degree of concurrency). An operating parameter may specify whether to enable tile caching or various other forms of caching or caching policies. Furthermore, an operating parameter may specify a core clock frequency, a memory interface clock frequency, and the like.

Tuning the operating parameters in response to varying PM values can improve throughput and/or power efficiency of the multiprocessing unit. A given multiprocessing unit can include many thousands of PMs and multiple different operating parameters that can be changed to tune the operation of the multiprocessing unit. Prior-art heuristic-based solutions commonly are not operable in real-time, tend to be hard-coded based on a limited set of workloads and parameters, cannot be dynamically updated, and may fail to select and utilize salient PM values and other state data to effectively tune multiprocessing unit operation for a specific application (e.g. a multithreaded application). By contrast, machine learning techniques can be applied to determine operating parameters as well as select and appropriately utilize PM values having higher correlation to operating goals and seamlessly incorporate other state data to more effectively tune the operating parameters. A machine learning approach that implements a neural network based approach can provide selection of an efficient and/or optimal set of PM values or features based on constraints that consider both computation cost and latency. Furthermore, a neural network implemented to determine operating parameters based on PM values (and other relevant inputs) can operate in real time and be updated dynamically.

A given application executing on the multiprocessing unit can have a particular workload profile that stresses certain resources over time and with varying utilization of the resources, leading to varying PM values during execution. A neural network subsystem receives PM values from the multiprocessing unit and may also receive one or more forms of other state data including application state, current operating parameter state, and driver cues for the multiprocessing unit. The neural network subsystem generates operating parameters that are transmitted back to the multiprocessing unit. As the application progresses and PM values change during the course of application execution, the neural network responds by updating the operating parameters to tune the ongoing operation of the multiprocessing unit.

The neural network can be trained separately (e.g., offline) to generate model parameters for execution of a given application. Different applications can have different model parameters (e.g., weights and/or activations). Furthermore, different portions of a given application can have different model parameters. Model parameters can be loaded into the neural network subsystem prior to launching the application, and the model parameters can be updated as the application executes.

The model parameters may be determined during offline training of the neural network subsystem for each different application and potentially each different operating mode of a given application (e.g., a game level). Additionally, with reinforcement models, the model parameters can be further trained during the run time of a given application.

FIG. 1A illustrates a flowchart of a method 100 for generating operating parameters for a multiprocessing unit, in accordance with one embodiment. Although the method 100 is described in conjunction with the systems of FIGS. 2-6, any processing system that implements method 100 is within the scope and spirit of embodiments of the present disclosure. One or more operations of the method 100 may be performed by task-specific circuitry or by a combination of task-specific circuitry and general-purpose processing units. In one embodiment, method 100 is performed by a graphics processing unit (GPU), which may include a general purpose microcontroller (embedded processor), a parallel processing unit (PPU), such as PPU 200 of FIG. 2, and performance monitors (PMs), comprising circuits configured to monitor and report various operational statistics of the PPU.

At step 102, the multiprocessing unit executes a multithreaded application according to one or more operating parameters. The operating parameters may include, without limitation, a core clock frequency, a memory interface clock frequency, a maximum number of related concurrently executing threads, and whether tile caching is enabled. In one embodiment, a core clock frequency is related to a core voltage through a lookup table, and setting the core clock frequency also sets the core voltage.

At step 104, performance monitor circuits within the multiprocessing unit measure performance monitor values during execution of the multithreaded application. At step 106, the performance monitor values are reported. In one embodiment, monitoring is performed periodically in real-time (e.g., every 5,000 GPU clock cycles) to record specific statistics related to execution of the multithreaded application. In one embodiment, the specific statistics include at least one of a memory request count, a memory system bandwidth utilization, a memory system storage capacity utilization, a cache hit rate, a count of instructions executed per clock cycle for one or more threads of the multithreaded program, and a count of instructions executed for one or more threads of the multithreaded program.

At step 108, a control unit generates the one or more operating parameters based on the performance monitor values. In one embodiment, the control unit includes a machine learning model configured to receive the performance monitor values as inputs and to update the one or more operating parameters as outputs during execution of the multithreaded application. In one embodiment, the one or more operating parameters include at least one of a maximum number of concurrently executing threads, a maximum number of active processing cores, a tile caching enable/disable flag, a core clock frequency, a memory interface clock frequency, and a core operating voltage.

Figure 1B:
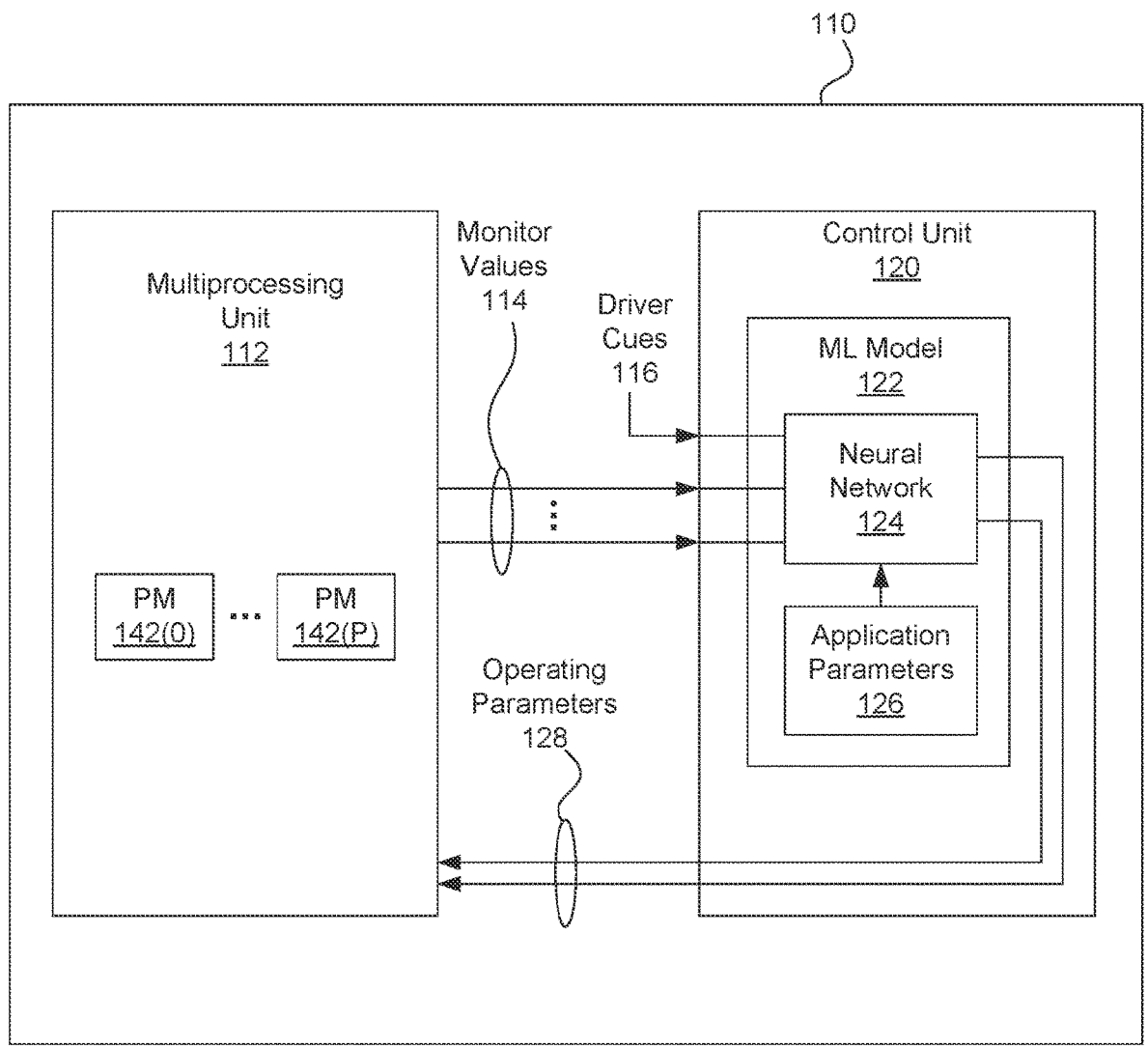
FIG. 1B illustrates a processing system, configured to implement one or more aspects of one embodiment.

FIG. 1B illustrates a processing system 110, configured to implement one or more aspects of one embodiment. As shown, the processing system 110 includes a multiprocessing unit 112 and a control unit 120. The multiprocessing unit 112 includes P performance monitors 142, configured to monitor various operational statistics values and report the values as monitor values 114. Furthermore, the multiprocessing unit 112 is configured to receive operating parameters 128 and execute multithreaded applications according to the operating parameters 128. The monitor values 114 may also include, without limitation, certain state information, such as currently configured values for operating parameters and application state information. In one embodiment, the multiprocessing unit 112 and the control unit 120 are fabricated within a common integrated circuit die, such as a GPU die. In one embodiment, the processing system 110 is implemented within PPU 200 of FIG. 2.

The control unit 120 implements a machine learning model 122, configured to receive the monitor values 114 as inputs. The monitor values 114 may be transmitted along a dedicated interconnect or signal tree. Alternatively, the monitor values 114 may be transmitted along a shared interconnect. More generally, any technically feasible technique may be implemented to transmit monitor values to control unit 120. The machine learning subsystem may also receive driver cues 116 as inputs. The driver cues 116 may include suggestions from a driver (not shown). Exemplary driver cues 116 include, without limitations, a suggestion to turn on (or off) tile caching, and a suggestion to increase/decrease a specified clock frequency (e.g., core, memory, etc.). In one embodiment, the driver is configured to control and manage overall operation of the processing system 110. The driver may perform certain methods (e.g., heuristics, optimizations, etc.) to generate the driver cues 116; however, the real-time state of the processing system 110 may or may not benefit from the suggestions indicated by the driver cues 116. As such, the machine learning model 122 may be configured to determine whether to accept a given suggestion from the driver cues 116. The machine learning model 122 evaluates, but is not required to implement any given suggestion.

In one embodiment, the control unit 120 is positioned at the top of a command pipeline configured to receive a command stream from the driver. The control unit 120 therefore has visibility into incoming commands in the command stream. The driver cues 116 may be transmitted within the incoming commands. Furthermore, the control unit 120 may insert commands into the command stream (inline commands), for example to transmit operating parameters 128 to the multiprocessing unit 112. Alternatively, the control unit 120 may write registers (via asynchronous commands) corresponding to specific operating parameters 128.

In one embodiment, the machine learning model 122 implements a neural network subsystem 124, configured to respond to the monitor values 114 by generating operating parameters 128, which are fed back to the multiprocessing unit 112. The neural network subsystem 124 can be implemented using any technically feasible techniques, including, without limitation, programming instructions executed on a processing unit that perform neural network evaluation, and logic circuits configured to directly implement neural network evaluation.

Figure 1C:
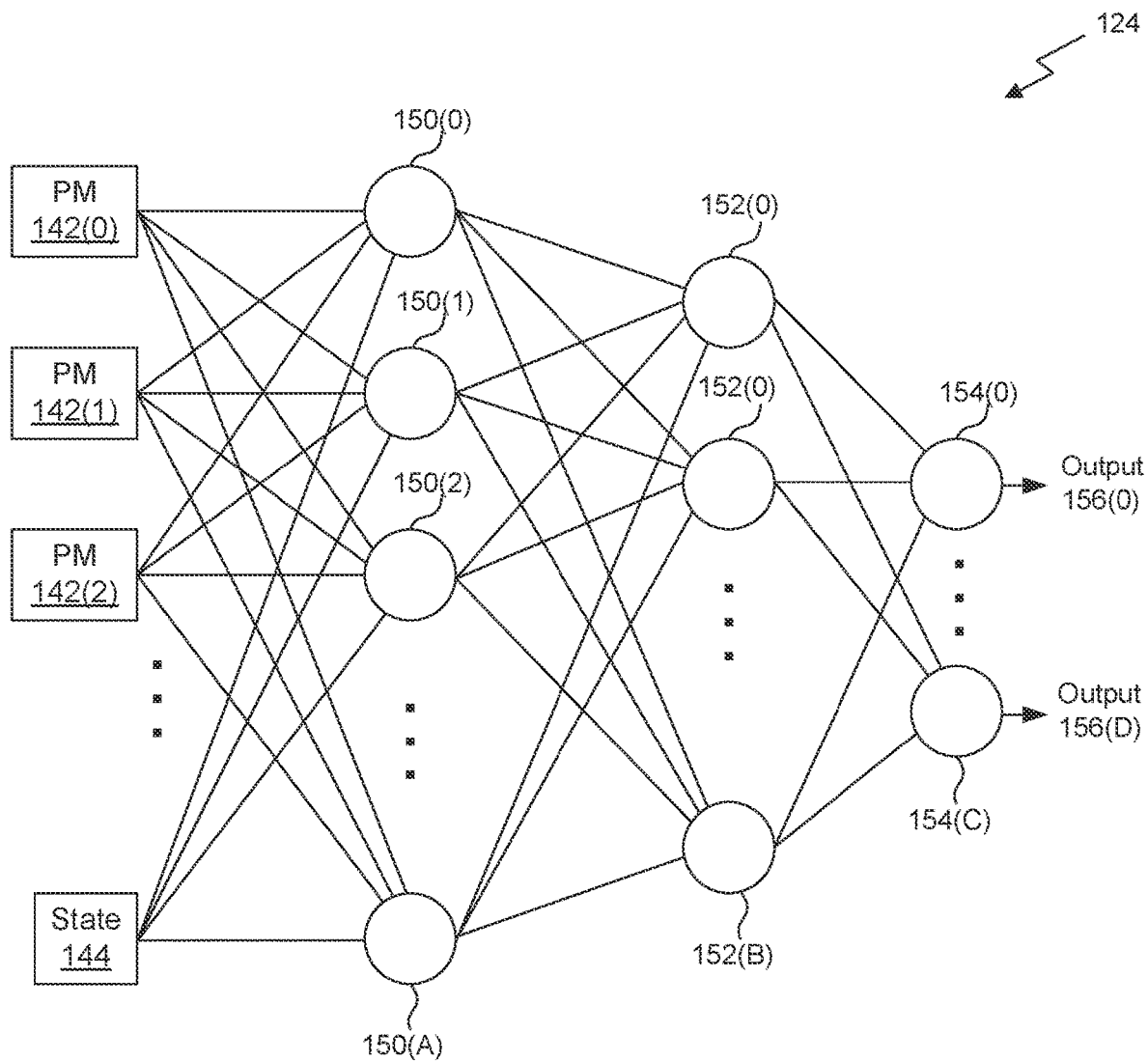
FIG. 1C illustrates an exemplary neural network, configured to implement one or more aspects of one embodiment.

FIG. 1C illustrates an exemplary neural network 124, configured to implement one or more aspects of one embodiment. As shown PMs 142 provide monitor values to a first rank of neural net nodes 150. Additionally, state information 144 may also provide values to the first rank of neural net nodes 150. The state information 144 may include driver cues 116, application state information, current values for one or more operating parameters (e.g., operating parameters 128), and the like. Each node of the first rank of neural net nodes 150 may receive each available input or a subset thereof. As shown, the first rank of A neural net nodes 150 is fully connected to a second rank of B neural net nodes 152. A third rank of C neural net nodes 154 provides outputs 156. A given output 156 may provide a continuous value, which may be scaled appropriately to drive a continuous operating parameter 128. Exemplary continuous operating parameters 128 include, without limitation, a maximum number of concurrently processed pixels, a clock frequency, and the like. Note that in the context of the following description, continuous refers to a large number (e.g., tens or more) of different potential quantized values. An operating parameter 128 may also be binary, having values of on or off. Enabling tile caching is a binary value and is either on or off. Different techniques may be implemented for determining a binary output state. For example, an output "on" node and an output "off" node may each generate an activation value, with the higher activation value determining whether the output should be on or off. More generally, any discrete state output may be generated according to a set of activation values.

Changing certain operating parameters 128 may have negative short term performance consequences. For example, changing the clock speed of external memory may require the memory clock to be shut down and restarted at a new frequency, thereby stalling all memory access activity while the clock is shut down. By contrast, changing a processor core frequency may be performed at any time without consequence. To avoid incurring unnecessarily frequent performance penalties, certain operating parameters 128 may implement hysteresis, requiring a sufficiently large transition to occur before a change is executed by the multiprocessing unit 112.

In one embodiment, application parameters 126 may be loaded prior or during execution of the neural network 124. The application parameters 126 may be computed offline as neural network model parameters, which may include neural network weights and activation values. A given multithreaded application may have one or more different sets of application parameters 126. For example, a multithreaded application may have a single set of application parameters 126, or different application parameters 126 that are applied according to application state. The control unit 120 may receive application parameters 126 from the driver prior to execution and/or during execution of the multithreaded application. The control unit 120 may receive explicit instructions from the driver indicating when to load a new set of application parameters 126. The explicit instructions and/or any other relevant information may comprise an event that triggers the control unit 120 to transition from a first set of application parameters 126 associated with a first multithreaded application context to a second set of application parameters 126 associated with a second multithreaded application context.

Depending on how many inputs are processed, the neural network 124 may require significant computation. To reduce computational effort, integer or fixed-point math operations may be employed to implement neural network computations. The control unit 120 may implement the neural network 124 as programming instructions executing on a microcontroller. Alternatively, the control unit 120 may implement the neural network 124 as a set of logic circuits that directly implement the computational structures for the neural network 124. In one embodiment, the number of inputs may range from several hundred to several thousand. The inputs may be read by control unit 120, using multiple outstanding read requests to increase read throughput.

In certain applications, such as computing clock speed for power efficiency, fewer layers of neurons may be needed. In one embodiment, a single layer, single node implements calculating a clock speed as one of the operating parameters 128. A separate control unit 120 may be configured to generate clock speed and/or other power and/or efficiency related operating parameters 128.

Figure 1D:
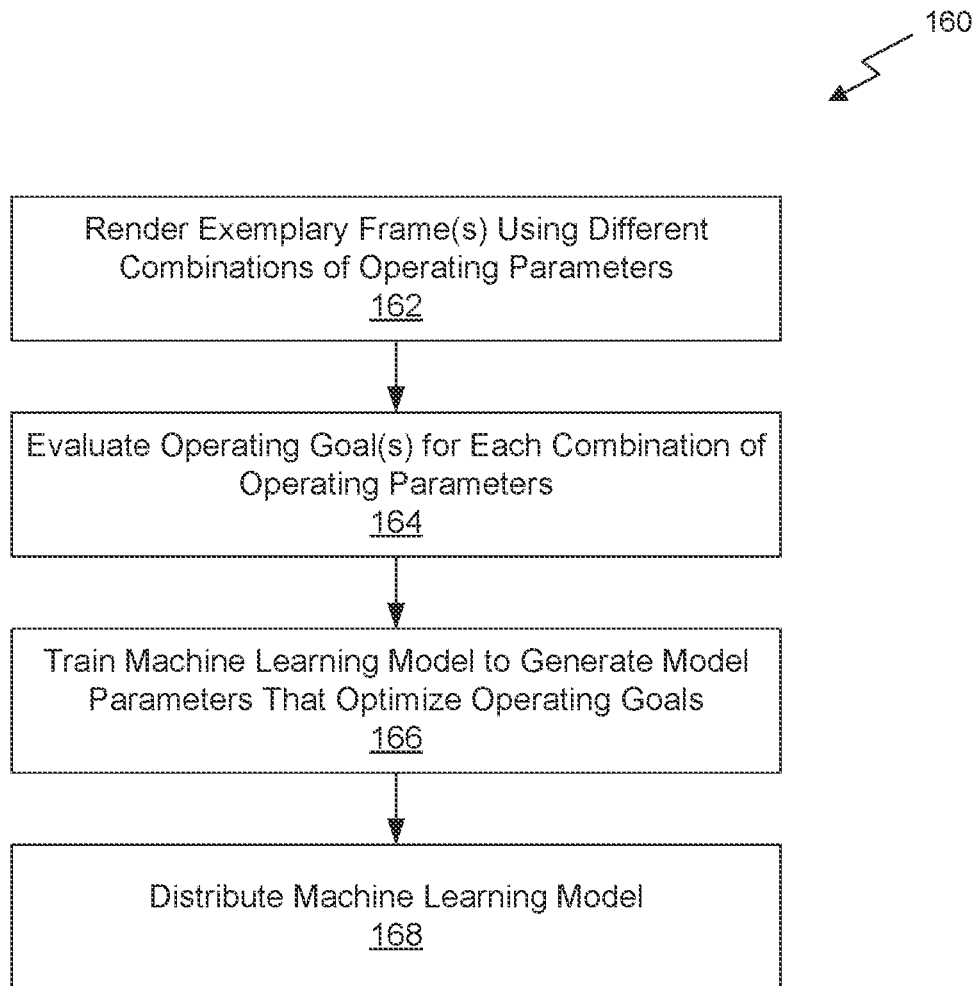
FIG. 1D illustrates a flowchart of a method for training a machine learning model to generate operating parameters, in accordance with one embodiment.

FIG. 1D illustrates a flowchart of a method 160 for training a machine learning model to generate operating parameters, in accordance with one embodiment. Although the method 160 is described in conjunction with the systems of FIGS. 2-6, any processing system that implements method 160 is within the scope and spirit of embodiments of the present disclosure. One or more operations of the method 160 may be performed by task-specific circuitry or by a combination of task-specific circuitry and general-purpose processing units. In one embodiment, method 160 is performed by a training system, comprising a central processing unit (CPU) and a graphics processing unit (GPU). Method 160 may be performed in an off-line setting to generate model parameters for execution by a machine learning model in conjunction with executing a rendering application.

At step 162, the training system renders one or more exemplary frames using different combinations of operating parameters. The one or more exemplary frames may be taken from an application program and rendered using the different combinations of operating parameters. In one embodiment, the different combinations of operating parameters substantially include every possible combination of the operating parameters. During rendering of each of the one or more exemplary frames, different PM values may be stored for training.

At step 164, the training system evaluates one or more operating goals for each combination of the operating parameters. An operating goal may include, without limitation, throughput (rendering time) and power efficiency, instruction throttling, work partitioning, load balancing across processing cores, preemptively raising a supply voltage level provided to the processing cores. Each different combination of the operating parameters is evaluated according to an operating goal. The result of each evaluation may be a corresponding numeric value, along with an optimal set of operating parameters.

At step 166, the training system trains a machine learning model to generate model parameters that optimize one or more operating goals. The machine learning model is trained to predict the optimal set of operating parameters according to known combinations of operating results, including the different PM. Any technically feasible training technique may be implemented without departing the scope and spirit of various embodiments. For example, in a neural-network machine learning model, back-propagation techniques may be implemented train the machine learning model to determine operating parameters to substantially optimize operating goals.

At step 168, the training system distributes the machine learning model. In one embodiment, the training system generates a machine learning model comprising model parameters, and transmits the machine learning model over a data network (e.g., the Internet) to client devices configured to execute the application program. In another embodiment, the machine learning model is packaged with the application program and transmitted to a client device along with the application program.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
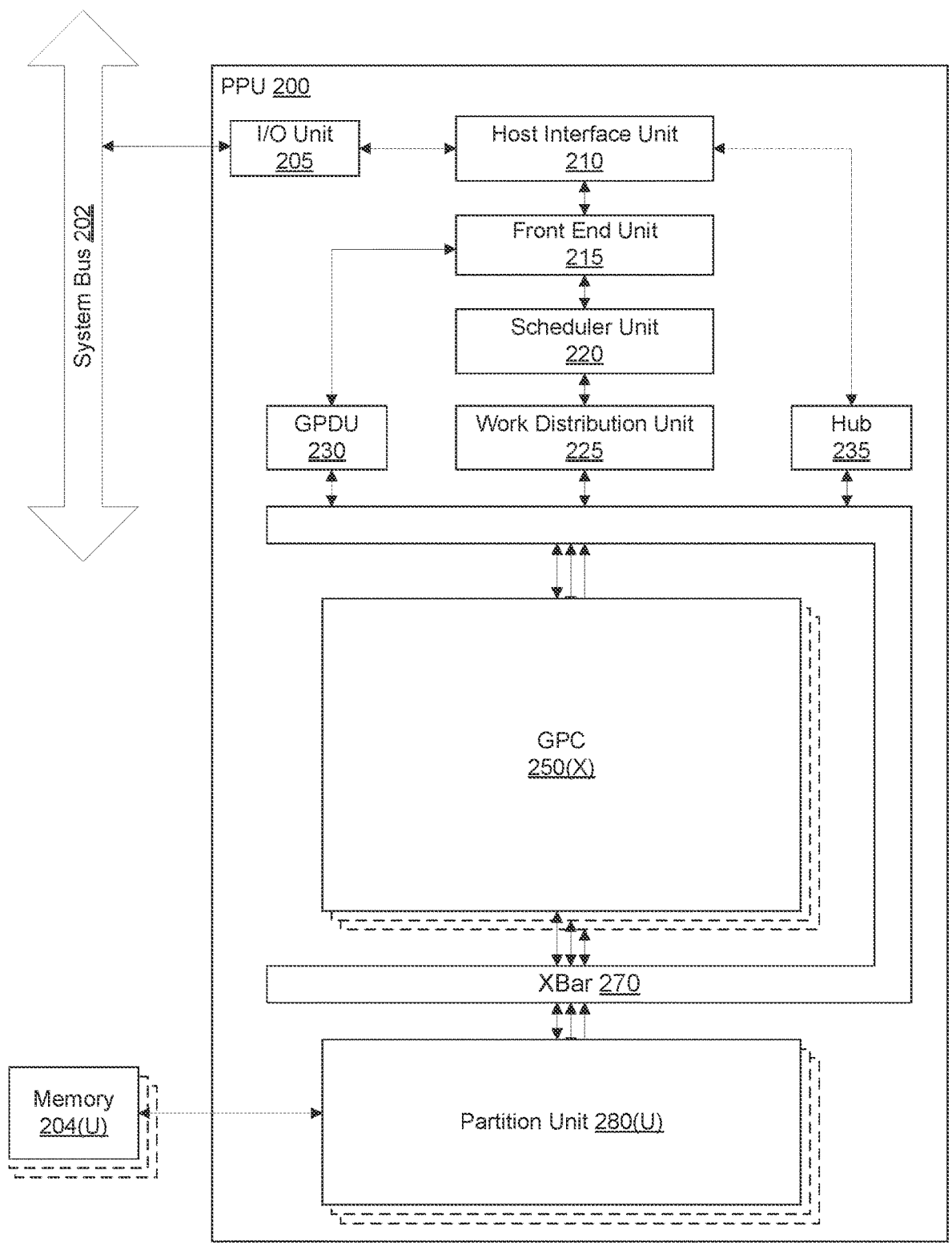
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 235 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
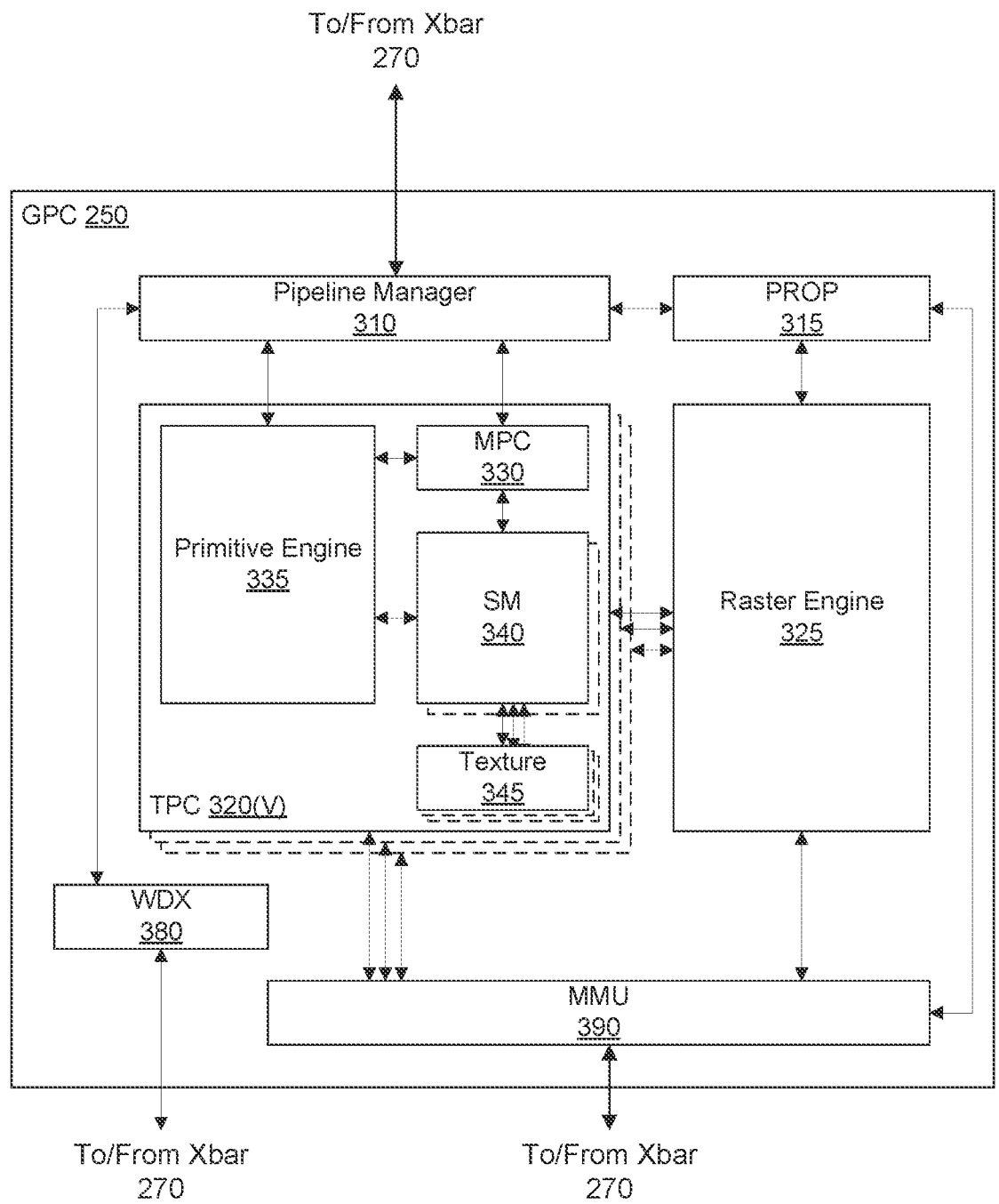
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
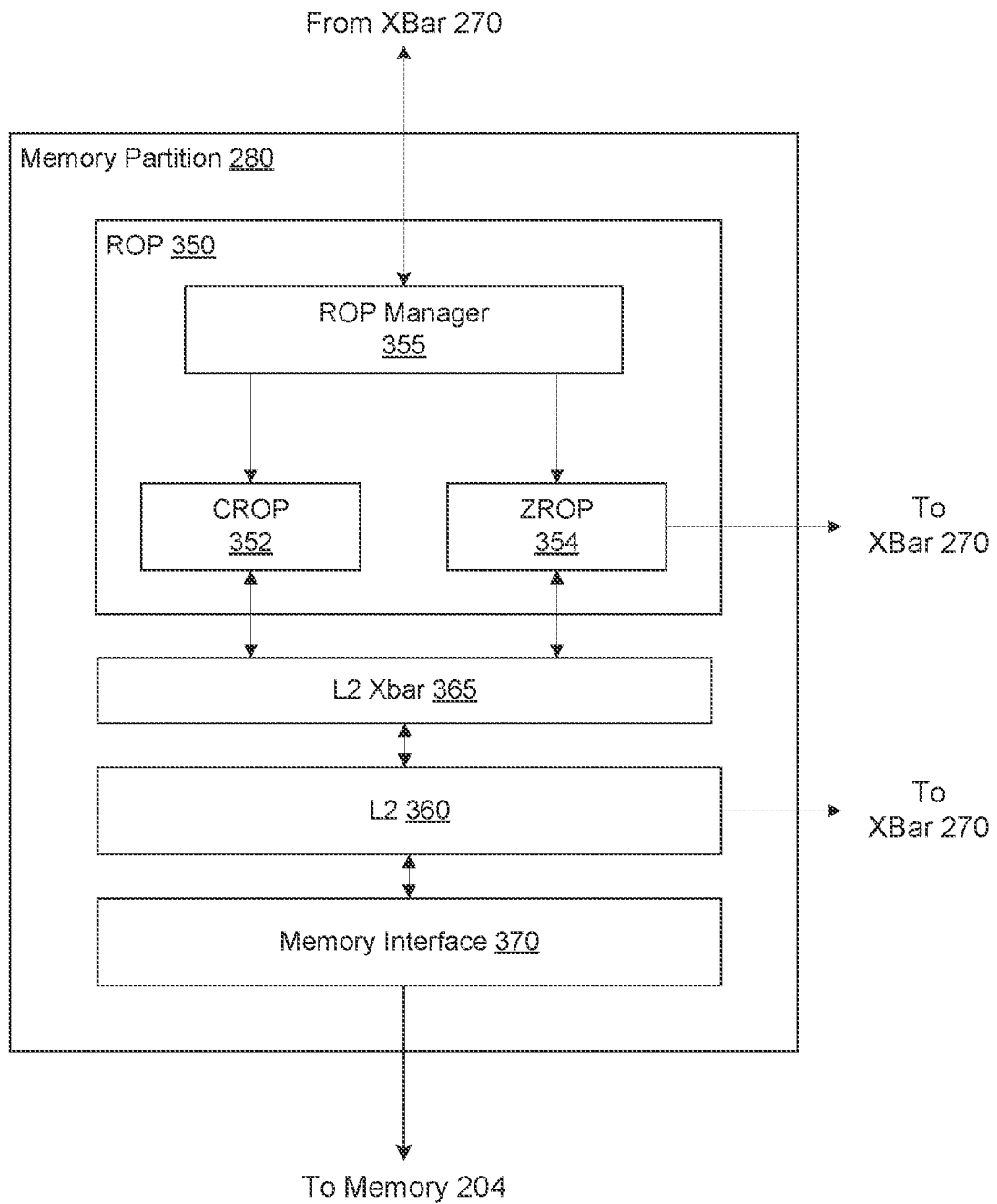
FIG. 3B illustrates a partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
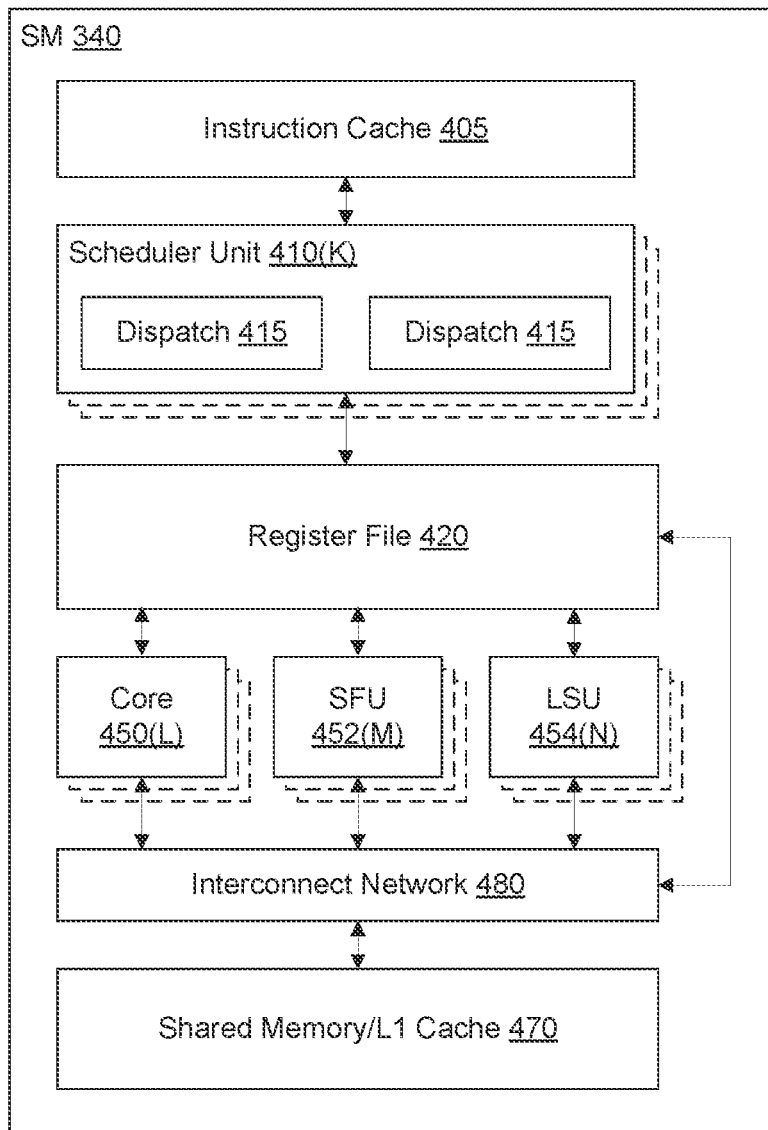
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K-

1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450 (i.e., 450(0) . . . 450(L-1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M-1)) that perform special functions (e.g., pixel blending operations, and the like), and N LSUs 454 (i.e., 454(0) . . . 454(N-1)) that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
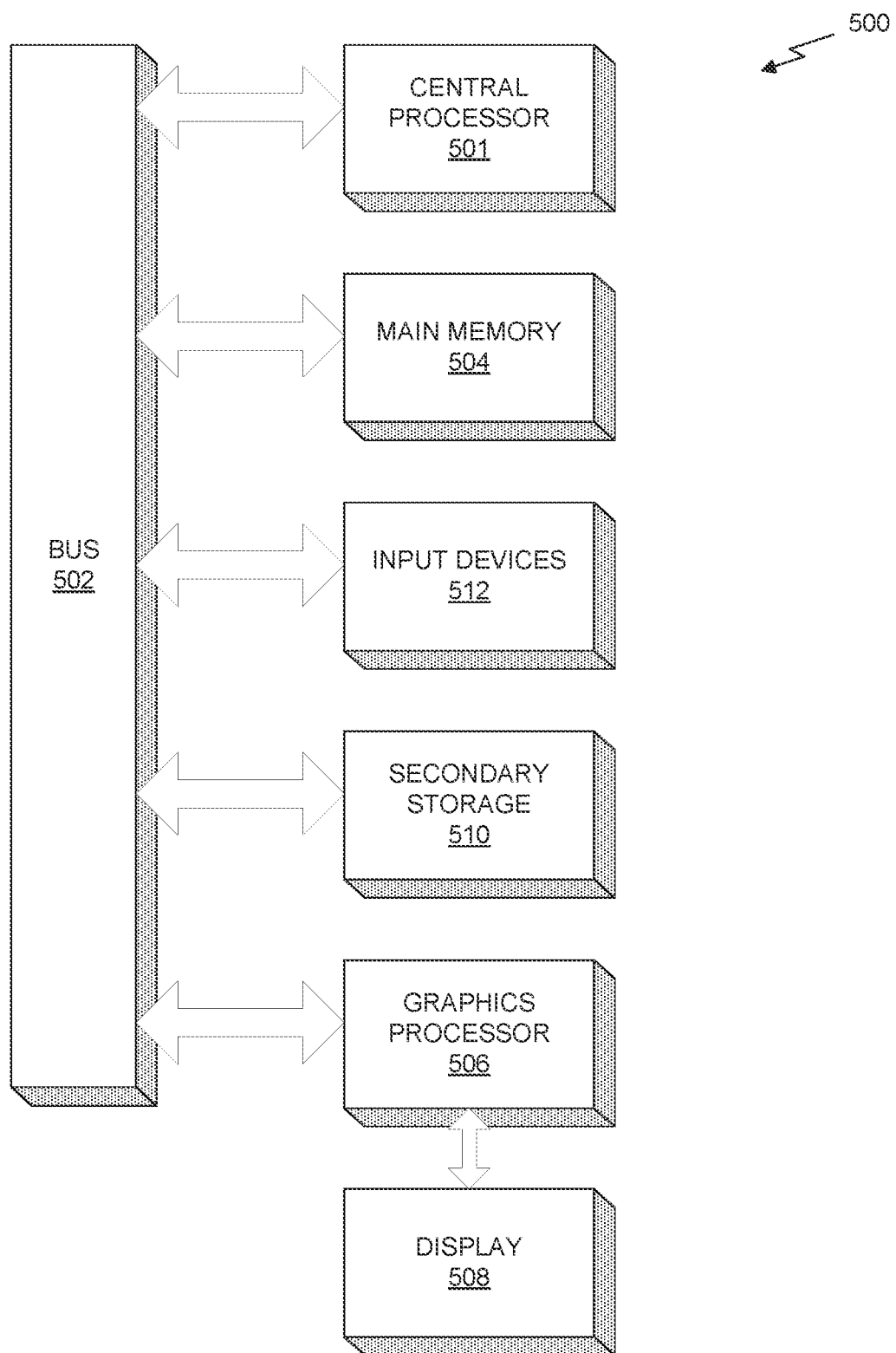
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. The exemplary system 500 may include one or more performance monitors 142 and a control unit 120. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display, head mounted display, or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU). In one embodiment, the multiprocessing unit 112 and the control unit 120, shown in FIG. 1B are fabricated within a common integrated circuit die, such as the graphics processor 506 die. In one embodiment, the processing system 110 is implemented within the central processor 501 die.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 504 and/or the secondary storage 510. Such computer programs, when executed, enable the system 500 to perform various functions. The memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, a virtual reality system, an autonomous vehicle, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

Figure 6:
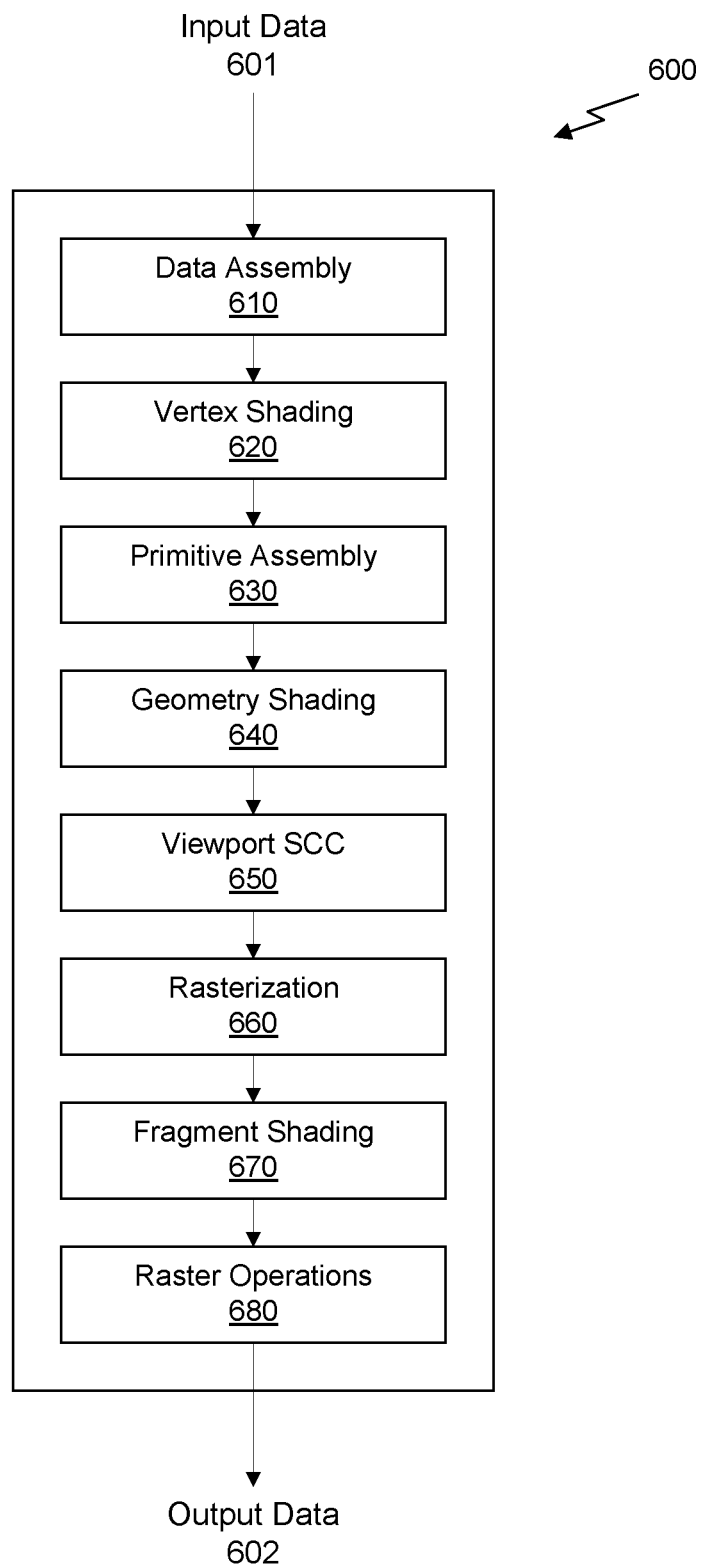
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 501. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 501. In other instances, the device driver may perform operations, at least in part, by launching operations on the PPU 200 utilizing an input/output interface between the CPU 501 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

What is claimed is:

1. A processing system, comprising:
a multiprocessing unit, assigned to execute instructions for a task associated with a multithreaded application according to one or more operating parameters that control how operations are performed during execution of the instructions by the multiprocessing unit without altering results of the operations, wherein the one or more operating parameters include at least one of a maximum number of concurrently executing threads, a maximum number of active processing cores, and a tile caching enable/disable flag;
performance monitor circuits configured to measure and report performance monitor values during execution of the instructions; and
a control unit coupled to the multiprocessing unit and configured to change the one or more operating parameters during execution of the instructions in response to changes in the performance monitor values,
wherein the control unit includes a machine learning model configured to predict an optimal set of the one or more operating parameters based on combinations of the performance monitor values.

2. The processing system of claim 1, wherein the machine learning model is a neural network and the control unit is further configured to use a first set of model parameters as neural network weights prior to execution of a first context of the multithreaded application.

3. The processing system of claim 2, wherein the control unit is further configured to use a second set of model parameters as the neural network weights during execution of a second context of the multithreaded application.

4. The processing system of claim 3, wherein an event occurs during execution of the instructions, and, in response, the control unit loads the second set of model parameters.

5. The processing system of claim 1, wherein the control unit includes a processing unit configured to execute programming instructions that implement the machine learning model.

6. The processing system of claim 1, wherein the control unit includes logic circuits configured to structurally implement the machine learning model.

7. The processing system of claim 1, wherein the performance monitoring values include at least one of a memory request counter, a memory system bandwidth utilization, a memory system storage capacity utilization, a cache hit rate, a count of instructions executed per clock cycle for one or more threads of the multithreaded application, and a count of instructions executed for one or more threads of the multithreaded application.

8. The processing system of claim 1, wherein the one or more operating parameters further include at least one of a core clock frequency, a memory interface clock frequency, and a core operating voltage.

9. The processing system of claim 1, wherein the machine learning model is a neural network that includes at least three layers, the first layer configured to receive performance monitoring values and the third layer configured to generate one of the one or more operating parameters.

10. The processing system of claim 9, wherein the one of the one or more operating parameters is generated by a single output node value.

11. The processing system of claim 9, wherein the one of the one or more operating parameters is generated by selecting an output node having the highest activation among a set of output nodes.

12. The processing system of claim 1, wherein the control unit is further configured to generate the one or more operating parameters based on one or more of an application state, a current operating parameter, and a driver cue.

13. A method, comprising:
executing, by a multiprocessing unit, instructions for a task associated with a multithreaded application according to one or more operating parameters that control how operations are performed during execution of the instructions by the multiprocessing unit without altering results of the operations, wherein the one or more operating parameters include at least one of a maximum number of concurrently executing threads, a maximum number of active processing cores, and a tile caching enable/disable flag;
measuring, by a performance monitor circuits performance monitor values during execution of the instructions;
reporting, by the performance monitor circuits the performance monitor values during execution of the instructions; and
changing, by a control unit that is coupled to the multiprocessing unit, one or more operating parameters during execution of the instructions in response to changes in the performance monitor values,
wherein the control unit includes a machine learning model configured predict an optimal set of the one or more operating parameters based on combinations of the performance monitor values.

14. The method of claim 13, wherein the machine learning model is a neural network and the control unit is further configured to use a first set of model parameters as neural network weights prior to execution of a first context of the multithreaded application.

15. The method of claim 14, wherein the control unit is further configured to use a second set of model parameters as the neural network weights during execution of a second context of the multithreaded application.

16. The method of claim 13, wherein the control unit includes a processing unit configured to execute programming instructions that implement the machine learning model or the control unit includes logic circuits configured to structurally implement the machine learning model.

17. The method of claim 13, wherein the performance monitoring values include at least one of a memory request counter, a memory system bandwidth utilization, a memory system storage capacity utilization, a cache hit rate, a count of instructions executed per clock cycle for one or more threads of the multithreaded application, and a count of instructions executed for one or more threads of the multithreaded application.

18. The method of claim 13, wherein the one or more operating parameters further include at least one of a core clock frequency, a memory interface clock frequency, and a core operating voltage.

19. The method of claim 13, wherein the machine learning model is a neural network that includes at least three layers, the first layer configured to receive performance monitoring values and the third layer configured to generate one of the one or more operating parameters.

20. A non-transitory, computer-readable storage medium storing instructions that, when executed by a processor, cause the processor to:
    execute, by a multiprocessing unit, instructions for a task associated with a multithreaded application according to one or more operating parameters that control how operations are performed during execution of the instructions by the multiprocessing unit without altering results of the operations, wherein the one or more operating parameters include at least one of a maximum number of concurrently executing threads, a maximum number of active processing cores, and a tile caching enable/disable flag;

measure, by a performance monitor circuits performance monitor values during execution of the instructions;

report, by the performance monitor circuits the performance monitor values during execution of the instructions; and change, by a control unit, one or more operating parameters during execution of the instructions in response to changes in the performance monitor values, wherein the control unit includes a machine learning model configured to predict an optimal set of the one or more operating parameters based on combinations of the performance monitor values.

* * * * *